US012134921B2

(12) United States Patent
Stoimenov

(10) Patent No.: US 12,134,921 B2
(45) Date of Patent: Nov. 5, 2024

(54) METHOD, A SYSTEM AND A DEVICE FOR CONTROLLING A FRONT COMPARTMENT LID OF A VEHICLE

(71) Applicant: ENHANCE Ltd, Sofia (BG)

(72) Inventor: Dimitar Nikolov Stoimenov, Sofia (BG)

(73) Assignee: ENHANCE Ltd, Sofia (BG)

( * ) Notice: Subject to any disclaimer, the term of this patent is extended or adjusted under 35 U.S.C. 154(b) by 254 days.

(21) Appl. No.: 17/816,682

(22) Filed: Aug. 1, 2022

(65) Prior Publication Data

US 2023/0042122 A1 Feb. 9, 2023

(30) Foreign Application Priority Data

Aug. 6, 2021 (EP) .................................... 21472004

(51) Int. Cl.
*E05B 81/76* (2014.01)
*E05B 81/72* (2014.01)

(52) U.S. Cl.
CPC .............. *E05B 81/76* (2013.01); *E05B 81/72* (2013.01)

(58) Field of Classification Search
CPC ................................ E05B 81/76; E05B 81/72
See application file for complete search history.

(56) References Cited

U.S. PATENT DOCUMENTS

| | | | | |
|---|---|---|---|---|
| 4,848,509 | A * | 7/1989 | Bruhnke | E05B 77/50 70/237 |
| 5,111,902 | A * | 5/1992 | Sundeen | E05B 77/48 180/281 |
| 2006/0208527 | A1* | 9/2006 | Freyholdt | E05B 81/76 296/146.1 |
| 2016/0251880 | A1* | 9/2016 | Bingle | E05B 81/76 701/49 |

* cited by examiner

*Primary Examiner* — Hussein Elchanti
*Assistant Examiner* — Oliver Tan
(74) *Attorney, Agent, or Firm* — MARSHALL, GERSTEIN & BORUN LLP

(57) ABSTRACT

A method, system and device for controlling a front compartment lid of a vehicle includes a way of opening or closing of the lid of a front compartment of a vehicle via door handle of the vehicle. The system includes a control unit of the vehicle, a front compartment with a lid with electrically controlled locking and/or opening mechanism and at least one vehicle door handle, and a logical block configured to monitor a status of vehicle door handle by a sensor for position of door handle between open position and closed position; monitor the locking status of the locking and/or opening mechanism; and, in case of matching vehicle door handle sensor data with a preset threshold value, and depending on the current locking status of the front compartment lid, generate a control signal to the locking and/or opening mechanism of the front compartment lid.

16 Claims, 3 Drawing Sheets

METHOD, A SYSTEM AND A DEVICE FOR CONTROLLING A FRONT COMPARTMENT LID OF A VEHICLE

CROSS-REFERENCE TO RELATED APPLICATION

The present application claims priority to European Application No. 21472004.7, filed Aug. 6, 2021. The priority application, EP 21472004.7, is hereby incorporated by reference.

TECHNICAL FIELD OF THE INVENTION

The invention relates to a method, a system and a device for controlling a front compartment lid of a vehicle. More precisely the invention relates to a way of opening or closing of the lid of a front compartment of a vehicle via door handle of the vehicle. The invention is applicable in the automotive industry.

BACKGROUND OF THE INVENTION

There are various ways to open the front compartment lid of a car from the outside. For this purpose, it is necessary to send a signal to the central control unit of the car, which activates the mechanisms for holding the lid in the closed position. Usually, this is possible by pressing a special button on the remote (key fob) for unlocking the car as described in US 20140088826 A1. Another option is to open with a special button on the outer surface of the car. It is known to open with a photocell located at the bottom of the car body, which detects movement, for example from a person's foot, and sends a signal to the central control unit. It is also known to open the lid by sliding/waving the hand over its surface through a capacitive proximity sensor. The inconvenience of choosing known methods and systems for opening the front compartment lid is the need to use an additional device or install special buttons and sensors for this purpose in the car. This complicates the known systems and makes them more expensive.

SUMMARY OF THE INVENTION

It is an object of the present invention to provide an alternative method and system for opening the front compartment (front trunk) of a car which does not require the presence of a person inside the car, does not require the use of additional devices such as a wireless remote control, a key fob or a smart phone and for many modern cars does not require installation of special buttons or sensors for this purpose.

The above-mentioned aim is achieved by a method of controlling a front compartment lid of a vehicle according to the present invention. Said vehicle comprises a control unit, a front compartment with a lid, an electrically controlled front compartment lid locking and/or opening mechanism and at least one vehicle door handle. The method comprises the following steps:

- monitoring of a status of said at least one vehicle door handle by receiving in the control unit of data from a sensor for position of said door handle between open position and closed position;
- monitoring at least of locking status of said locking and/or opening mechanism of the front compartment lid;

- comparing of said data from the vehicle door handle sensor with a preset threshold value of the position of said door handle;
- in case of matching said vehicle door handle sensor data with said preset threshold value, generating a control signal to the locking and/or opening mechanism of the front compartment lid, said control signal being generated also depending at least on the current locking status of the locking and/or opening mechanism for the front compartment lid.

Preferably said sensor for said door handle is a sensor for angular position of the door handle.

Preferably said control signal is generated when the door handle is moved toward the opening position and the position of the door handle is up to said threshold value that is set between 45% and 75% of the position needed for opening of respective vehicle door.

More preferably the control signal is generated after the door handle is moved back to partially or fully closed position.

According to an embodiment the method additionally comprises monitoring of one or more of the following:

- current speed of the vehicle;
- current security status of the vehicle;
- current position of a gear selector of the vehicle;

wherein said control signal to the locking and/or opening mechanism of the front compartment lid is generated also depending on the current statuses of the locking and/or opening mechanism of the front compartment, on the current speed of the vehicle, on the security status of the vehicle and/or on current position of the gear selector.

The generated control signal can be any of the following: open or close the front compartment lid, lock or unlock of the front compartment lid, or any combination or consolidation of them.

The aim of the invention is achieved also by providing an electronic device with a communication port for connecting to a CAN bus of a vehicle and a logical block for operating an electrically controlled locking and/or opening mechanism of a front compartment lid of said vehicle. Said logical block is configured to compare data received from a sensor for position of a vehicle door handle with a preset threshold value and, in case of matching of said sensor data with said preset threshold value, to generate a control signal for the locking and/or opening mechanism of the front compartment lid of the vehicle. The control signal also depending on a current locking status of the front compartment lid and/or on a current status of the vehicle as provided by data received by one or more of following sensors: a sensor for locking status of the front compartment lid of the vehicle, a sensor for a current speed of the vehicle, sensors for a current security status of the vehicle and/or a sensor for a current position of a gear selector of the vehicle.

Preferably said communication port is OBD port.

According to the invention it is also provided a control system for a front compartment lid of a vehicle comprising

- a control unit,
- a front compartment of the vehicle with a lid and an electrically controlled front compartment lid locking and/or opening mechanism connected to the control unit for receiving control signals;
- a sensor for locking status of said front compartment lid, said sensor being connected to the control unit for sending data and at least one vehicle door handle with a sensor for position of said door handle between open position and closed position, being connected to the control unit for sending data.

According to the invention the control system further comprises a logical block for operating the locking and/or opening mechanism of the front compartment lid of the vehicle connected with the control unit, said logical block being configured to compare the data from said sensor for position of the door handle with a preset threshold value and, in case of matching said sensor data with said preset threshold value, to generate a control signal for the locking and/or opening mechanism of the front compartment lid of the vehicle, wherein generation of said control signal depending also on a current locking status of the front compartment lid of the vehicle.

Preferably said sensor for position of said door handle is a sensor for angular position of the door handle.

Preferably said at least one door handle is movable between open and closed position, wherein said logical block is configured to generate said control signal when the position of the door handle is up to the threshold position set between 45% and 75% of the position needed for opening of the respective vehicle door.

More preferably said logical block is configured to generate said control signal after the door handle is moved back to partially or fully closed position.

According to an embodiment of the control system it further comprises a sensor for current speed of the vehicle, a sensor for current security status of the vehicle and/or a sensor for current position of a gear selector of the vehicle, each of said sensors being connected to the control unit for sending data, wherein said logical block is configured to generate a control signal for the locking and/or opening mechanism of the front compartment lid also depending on a current status of the vehicle as provided by data received by at least one of said sensors for current speed of the vehicle, for current security status of the vehicle and/or for current position of a gear selector of the vehicle.

The control signal is chosen from the following: open or close the front compartment lid, lock or unlock the locking mechanism of the front compartment lid, or any combination or consolidation of them.

Preferably said logical block is a part of an external electronic device connected to the control unit of the vehicle, providing access to the CAN bus of the vehicle. The communication port for connecting said external electronic device to a CAN bus can be an OBD port.

Preferably said at least one vehicle door handle is a handle of a front door of the vehicle.

The advantage for the driver/passenger of using a vehicle door handle to initiate opening of the front compartment lid is that it is not necessary to enter the car to do so and no additional means are required such as remote key fob. Also, for the most of the contemporary cars in order to implement the method and the system of the present invention there is no need to change the existing car construction or to install additional sensors, actuators, buttons or connections. The only modification is to install the logical block of the present invention in the control unit of the car or to connect an external electronic device with said logical block to the CAN bus of the car. Another advantage is that the driver/passenger is not required to have his/her hands free—he/she can use them to open the front compartment with bags in hands after shopping for example.

BRIEF DESCRIPTION OF THE FIGURES

Hereinafter, the method, system and device subject of the invention are explained by preferred embodiments, given as non-exhaustive examples, with reference to the accompanying figures, where.

EXAMPLES OF EMBODIMENTS AND OPERATION OF THE INVENTION

The method and the system of the present invention are applicable to vehicles, particularly cars, which have at least two front doors with respective opening handles and a front compartment such as front trunk that has a lid 1 with a locking and/or opening mechanism 2. This locking and/or opening mechanism 2 is electrically controlled by a central control unit 4 of the car.

Figure 1:
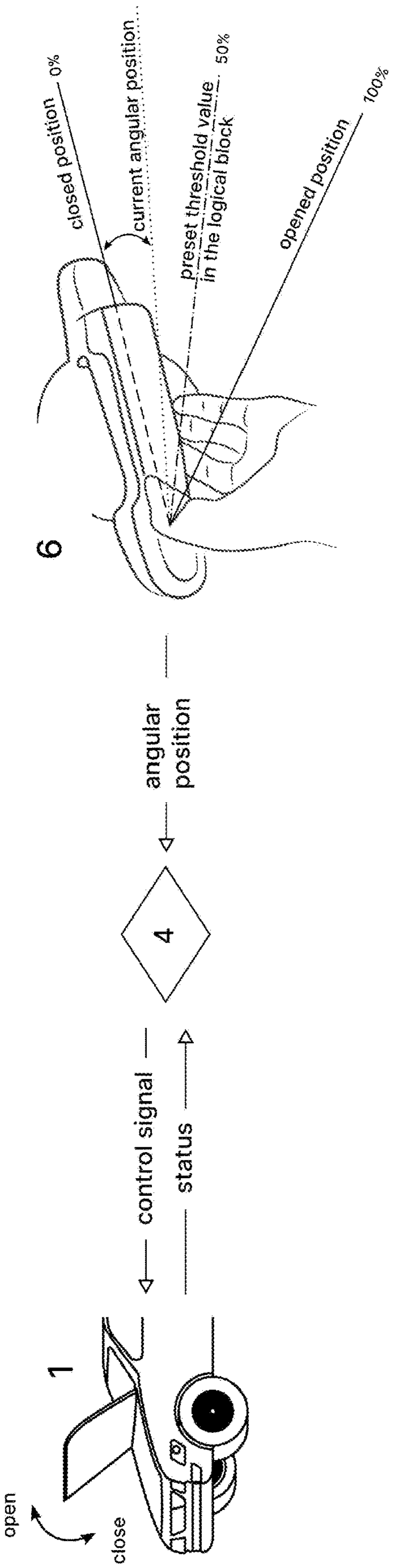
FIG. 1 is a schematic chart of an embodiment of the claimed control system with detailed visualisation of the door handle operation.

According to the method of the present invention the locking and/or opening mechanism 2 of the front compartment lid 1 is controlled through the car door handle 6. In order to open the door in most of the cars the door handle 6 should be moved by the user from one (closed) end position to another (open) end position (FIG. 1). In this movements parts of the door handle 6 change their position. Many cars have built-in sensors that detect the movements of the door handle 6 and can register current angular position of the door handle. Such sensor could be, for example angular sensors which operate according to the Hall principle, or rotary potentiometer (as described in US20080307711A1), or magnetic position sensors (as described in US20210003395A1, US20210018336A1), or rotary sensor (as described in US20170275930A1), or position sensors with a magnetic field detector (US2018094463A1), or a throttle position sensor (WO2016092564A2). This information in the form of digital data is sent to the control unit 4 of the car. The present method uses this data for the movements of the door handle 6 to determine the intention of the user to open the door or to initiate another command to the car—opening or closing of the front compartment lid 1. For this purpose, the present method monitors the movement of the door handle 6 between closed and open position and its current position.

If the position of the handle matches 100% the open position of the handle, the control unit 4 opens the door by an eclectic command—generates a control signal to the electrically controlled door opening mechanism. Or, in case the door is not electrically controlled, the control unit 4 does not generate any signal and the door opens mechanically.

Figure 2:
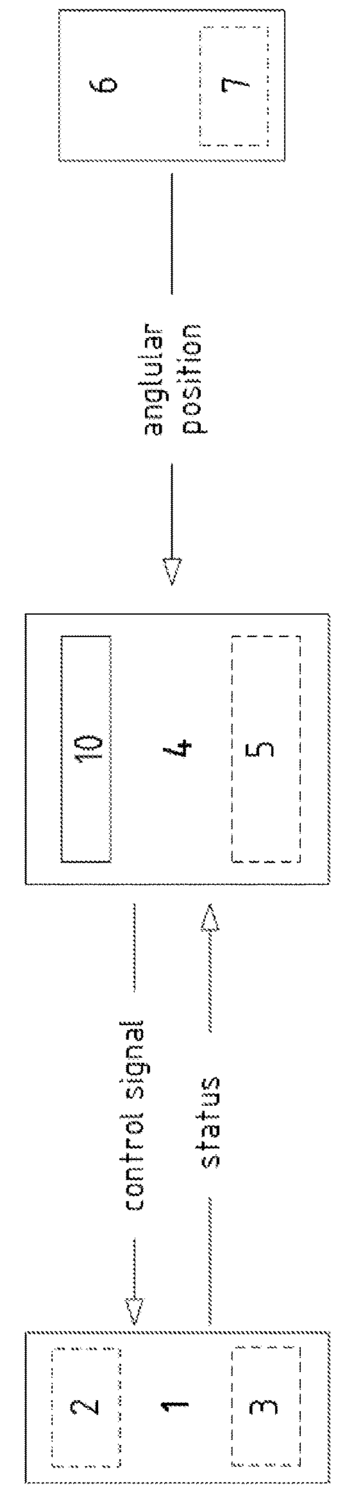
FIG. 2 is a schematic chart of an embodiment of the claimed control system with a build-in logical block in the control unit.

In case where there is an angular sensor (as in the embodiments shown on FIGS. 1, 2 and 3), if the angular position of the door handle 6 has a different value that matches a preset threshold value, for example less than 45, 50, 60, 70 or 75% of the angular position needed for opening of the respective door, the control unit 4 may generate a control signal to the electrically controlled locking and/or opening mechanism 2 of the front compartment lid 1. Whether and what signal will be generated depends on the data of the current status of the locking and/or opening mechanism 2 of the front compartment lid 1. For this purpose, the control unit 4 monitors the current status of the locking and/or opening mechanism. For example, if the front compartment lid 1 is closed and locked the control unit 4 can generate a control signal to unlock the locking and/or opening mechanism 2. Any suitable electrical, mechanical, or electromechanical sensor 3, known from the prior art, can be used to monitor the current status of the locking and/or opening mechanism 2.

In case the front compartment lid 1 is equipped with automatic opening and closing mechanism, the control unit 4 can generate control signals for unlocking and opening of the lid. In this variant, if the front compartment lid 1 is opened, the control unit 4 can generate control signals to the locking and/or opening mechanism 2 for closing and/or locking of the lid 1. In case when the lid 1 has no automatic opening and closing mechanism, the control unit 4 will not generate a control signal to the locking mechanism 2 of the lid 1 if the lid 1 is unlocked or opened.

According to the equipment of the car and on the current locking status of said locking and/or opening mechanism 2 the control signal/s could be: to unlock the lid; to open the lid; to unlock and to open the lid; to close the lid; to lock the lid or to close and lock the lid.

In one variant of the method the control unit 4 is configured to generate a control signal to the locking and/or opening mechanism 2 only if the user moves (pulls or pushes) the door handle 6 up to the threshold position and then returns back the door handle 6 into the partially or fully closed position.

In another variant of the method the control unit 4 is configured to generate a control signal in case the user moves (pulls or pushes) the door handle 6 up to the threshold position and holds the handle in this position for a preset time (for example, several seconds).

In another variant of the method the control unit 4 is configured to generate a control signal in case the user moves (pulls) the door handle 6 from closed position to opened position and holds the handle in this position for at least 2 seconds or more.

In another variant the method it additionally comprises monitoring of other parameters and statuses of the car in order the control unit 4 to decide whether and what kind of control signal/s to generate. Before opening the front compartment lid 1, it should be checked if this is safe. For this purpose, the control unit 4 can additionally monitor one or all of the following:

a current speed of the vehicle;

a current security status of the vehicle;

a current position of a gear selector of the vehicle.

As it is not advisable to open the front compartment lid 1 when the car is moving, the control unit 4 will not generate a control signal for said lid in case the current speed of the vehicle is other than 0.

Also, it is not advisable to open the front compartment lid 1 when the car doors are locked. Therefore, the control unit 4 can be configured to generate a control signal for unlocking and/or opening the front compartment lid 1 only if the car doors are unlocked.

In cars with automatic gearbox the control unit 4 can be configured to generate a control signal for unlocking and/or opening the front compartment lid 1 only if the gear selector is in "parking" position.

According to the invention the system that implements the above method of controlling a front compartment lid 1 of a vehicle comprises at least (FIG. 2):

a control unit 4, that could be the central control unit (central computer) of the vehicle or a separate built-in electronic device;

a front compartment with a lid 1 and an electrically controlled front compartment lid locking and/or opening mechanism 2 connected to the control unit 4 for receiving control signals;

a sensor for locking status 3 of said front compartment lid 1, said sensor being connected to the control unit 4 for sending data;

at least one vehicle door handle 6 with a sensor for position 7 of said door handle 6 between open position and closed position, being connected to the control unit 4 for sending data, a logical block 5 for operating the locking and/or opening mechanism 2 of the front compartment lid 1 connected with the control unit 4. This logical block 5 is configured to process data from the mentioned sensors (3, 7) and to generate or not a control signal/s for the locking and/or opening mechanism 2 of the front compartment lid 1.

The locking and/or opening mechanism 2 can be any known such mechanism that is electrically controlled, for example an electromechanical locking part which rotates in order to hold the lid in the locked position and releases it by rotating in the opposite direction when a signal is sent to it (such mechanism is described in U.S. Pat. No. 4,667,990). The opening mechanism could be electrohydraulic pump or damper which extends when a signal is sent to it.

The sensor for locking status 3 of the front compartment lid 1 can be a simple push button mechanism located in the locking part itself. When the locking mechanism is in a specific state which doesn't allow the lid to open the sensor signals "a locked" state.

The control system can comprise, for example, one or both front door handles.

The sensor for position 7 of the door handle 6 can be for example angular sensors which operate according to the Hall principle, or rotary potentiometer (as described in US20080307711A1), or magnetic position sensors (as described in US20210003395A1, US20210018336A1), or rotary sensor (as described in US20170275930A1), or a position sensor with a magnetic field detector (US2018094463A1), or a throttle position sensor (WO2016092564A2). This way the door handle's sensor output signal is a variable signal corresponding to a precise angle at which the door handle 6 is pressed or pulled.

The logical block 5 is a dedicated software logic that is configured to monitor different states of the car systems and to take actions when predefined conditions are met. A threshold value for the position of the door handle 6 is set into the logical block 5. It is configured to monitor and compare data from the sensor for position 7 of the door handle 6 with said preset threshold value. In case the sensor data rises up to the point of the said preset threshold value and then decreases, the logical block 5 is configured to generate a control signal for the locking and/or opening mechanism 2 of the front compartment lid 1. Said threshold value could be less than the angular position of the handle 6 needed for opening of the door and can be, for example, 45, 50, 60, 70 or 75% or any value in-between of the opening position. In case the sensor data rises up to the point of said preset threshold value and then rises up even more, the logical block 5 is configured to ignore this action and does not generate a control signal.

Also, other conditions of the door handle 6 can be preset in the logical block 5 in order to generate said control signal.

For example, the logical block 5 can be configured to generate the control signal only after the door handle 6 is moved back in fully closed position.

Generation of said control signal by the logical block 5 depends also on the current locking status of the front compartment lid 1 that is monitored by the logical block 5. It is also configured to generate a control signal at particular locking status (for example when the lid is locked) or not to generate a control signal at other locking status (when the lid is unlocked).

In case the front compartment lid 1 is equipped with automatic opening and closing mechanism 2 the logical block 5 is configured to generate different control signals depending on the status of the lid: to unlock the lid, to open the lid, to unlock and open the lid, to close the lid, to lock the lid or to close and lock the lid.

In a preferred embodiment of the invention the control system also comprises at least one of the following sensors: a sensor for current speed of the vehicle, a sensor for current security status of the vehicle and/or a sensor for current position of a gear selector of the vehicle, each of said sensors being connected to the control unit 4 for sending data. In this embodiment the logical block 5 is configured to monitor the current status of the vehicle by data received from these sensors and to generate a control signal for the locking and/or opening mechanism 2 at preset conditions for the current status of the vehicle.

For example, the logical block 5 can be configured not to generate a control signal when:

- the car speed as detected by the sensor for current speed of the vehicle is other than 0;
- the car is locked as detected by the sensor for current security status;
- the gear selector is not in the "parking" position as detected by the respective sensor.

In all embodiments of the control system, it is possible that the logical block 5 is build-in in the control unit 4.

Figure 3:
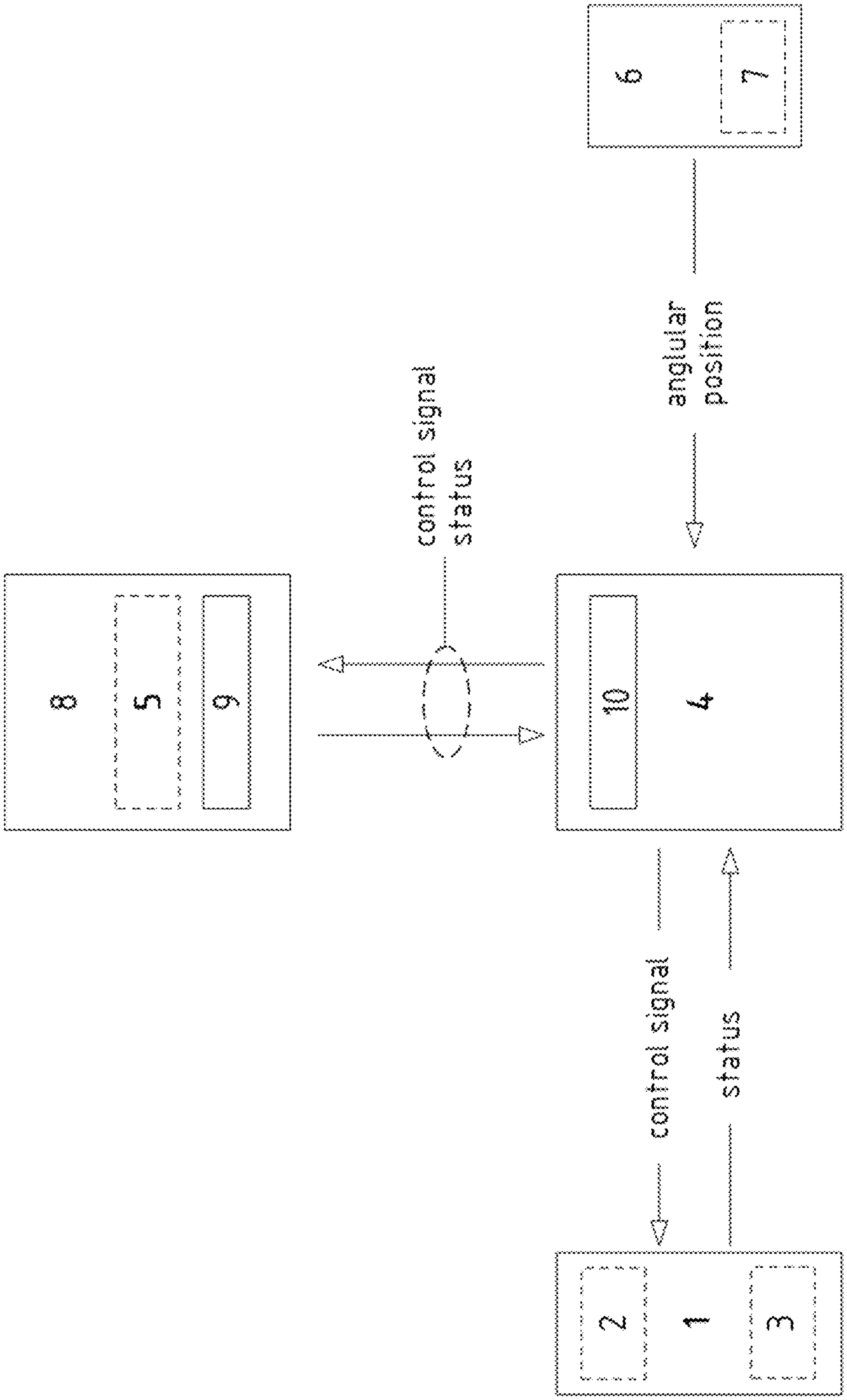
FIG. 3 is a schematic chart of an embodiment of the claimed control system with an external device with the logical block.

Also, in all embodiments of the control system, it is possible said logical block 5 to be a part of an external electronic device 8 connected to the control unit 4 through a standard connector 10 or any other way giving access to the CAN bus of the vehicle (FIG. 3). This external electronic device can be a processing unit consisting of a microcontroller for the logic, connector for the vehicle 9, LED indicators for the status and a plastic case for protection and shielding. The processing unit can have CAN network capabilities in order to communicate with the main control unit 4 in the vehicle. The connectors 9, 10 for the vehicle can be OBD ports or any other suitable connector type, which allows fast and reliable plug-in and release.

Examples for the Operation of the Control System

In the example control system, the sensor for position 7 of the door handle 6 is a sensor for angular position and the logical block 5 is configured with a threshold for the door handle angular position of 50% from the angular position needed for opening of the door and to send signal only when the door handle 6 is fully released to 0%. Configured door handle 6 is the front left door handle of the vehicle.

Figure 4:
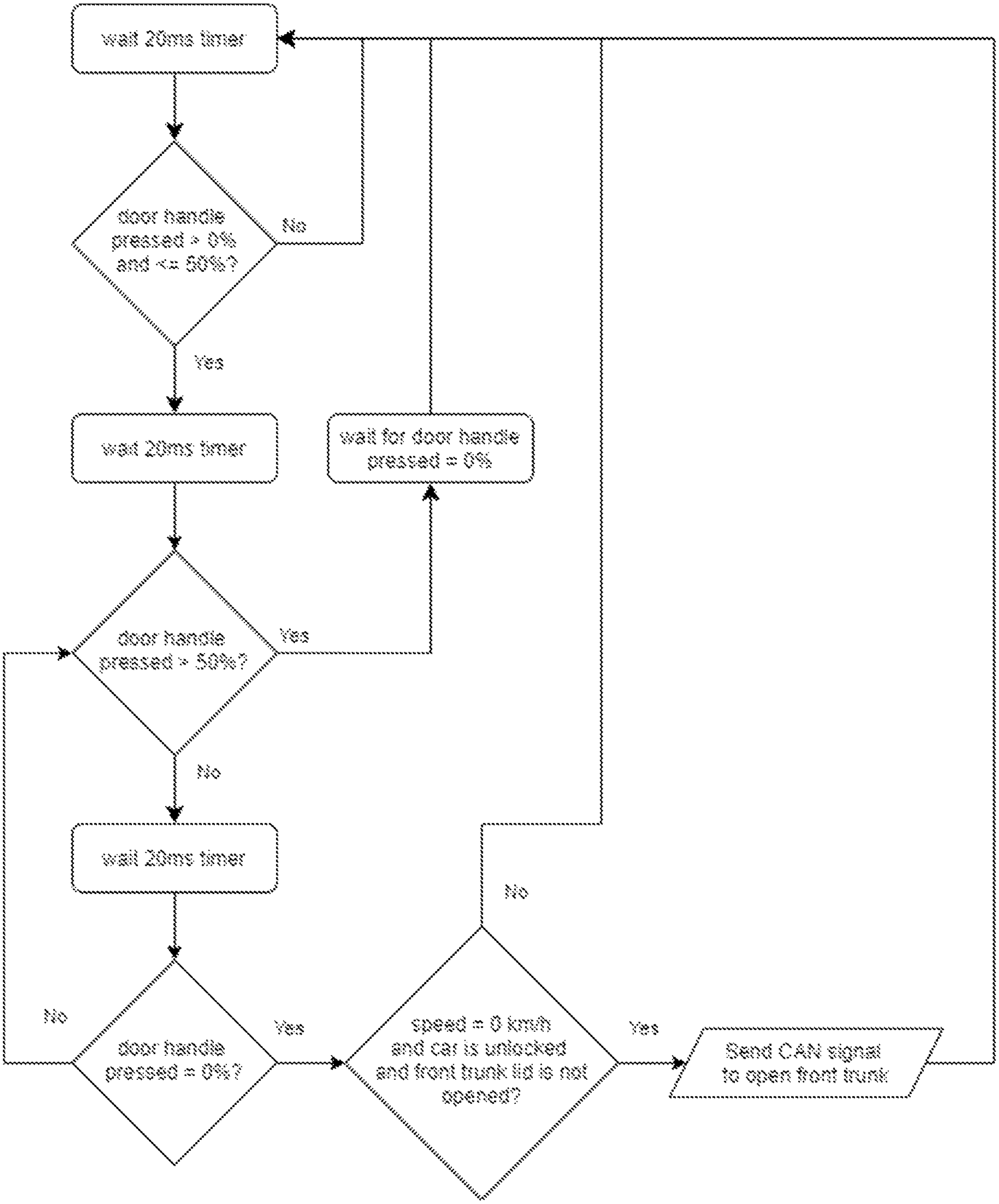
FIG. 4 is a block diagram of the algorithm according to the claimed method.

The logical block 5 of the system monitors the state of the front left door handle every 20 ms. The logical block is set to perform the following algorithm (FIG. 4):

- if the door handle 6 is pressed/pulled and the angle changes from 0% to not more than 50% continue with the logic;
- if the door handle 6 is pressed/pulled more than 50% stop the algorithm and wait until the door handle 6 goes back to 0% in order to start monitoring again;
- if the door handle angle changes back to 0% check the pre-conditions for opening the front compartment lid 1: if the car is not moving (speed is 0 km/h) and if the car is unlocked and if the front compartment lid 1 is not already opened;
- then, send signal to the CAR in order to open the front compartment lid 1 and reset the logic to start monitoring again;
- if pre-conditions are not met just start monitoring again from the beginning.

The reference numbers of the technical features are included in the claims only for the purpose of increasing the comprehensibility of the claims and, therefore, these reference numbers have no limiting effect on the interpretation of the elements indicated by these reference numbers.

The invention claimed is:

1. A method of controlling a front compartment lid of a vehicle, said vehicle comprising a control unit, a front compartment with a lid, an electrically controlled front compartment lid locking and/or opening mechanism and at least one vehicle door handle, comprising:

- monitoring of a status of said at least one vehicle door handle by receiving in the control unit of data from a sensor for position of said door handle between open position and closed position;
- monitoring at least of locking status of said locking and/or opening mechanism of the front compartment lid;
- comparing said data from the vehicle door handle sensor with a preset threshold value of the position of said door handle; and
- in case of matching said vehicle door handle sensor data with said preset threshold value, generating a control signal to the locking and/or opening mechanism of the front compartment lid, said control signal being generated also depending at least on the current locking status of the locking and/or opening mechanism of the front compartment lid.

2. The method according to claim 1, said control signal being generated when the door handle is moved toward the opening position and the position of the door handle is up to said threshold value that is set between 45% and 75% of the position needed for opening of respective vehicle door.

3. The method according to claim 2, said control signal being generated after the door handle is moved back to partially or fully closed position.

4. The method according to claim 1, further comprising monitoring of one or more of the following:

- current speed of the vehicle;
- current security status of the vehicle;
- current position of a gear selector of the vehicle;

wherein said control signal to the locking and/or opening mechanism of the front compartment lid is generated also depending on the current status of the locking and/or opening mechanism of the front compartment, on the current speed of the vehicle, on the security status of the vehicle and/or on current position of the gear selector.

5. A method of controlling a front compartment lid of a vehicle according claim 1, the control signal initiating any one or more of the following: open or close the front compartment lid, lock or unlock of the front compartment lid.

6. The method according to claim 1, said sensor for sensing a position of said door handle being a sensor for sensing an angular position of the door handle.

7. An electronic device with a communication port for connecting to a CAN bus of a vehicle and a logical block for operating an electrically controlled locking and/or opening mechanism of a front compartment lid of said vehicle, said logical block being configured to compare data received from a sensor for position of a vehicle door handle with a preset threshold value and, in case of matching of said sensor data with said preset threshold value, to generate a control signal for the locking and/or opening mechanism of the front compartment lid of the vehicle, wherein said control signal also depending on a current locking status of the front compartment lid and/or on a current status of the vehicle as provided by data received by one or more of following sensors: a sensor for locking status of the front compartment lid of the vehicle, a sensor for a current speed of the vehicle, sensors for a current security status of the vehicle and/or a sensor for a current position of a gear selector of the vehicle.

8. The electronic device according to claim 7, said communication port being an OBD port.

9. A control system for a front compartment lid of a vehicle comprising a control unit, a front compartment of the vehicle with a lid and an electrically controlled front compartment lid locking and/or opening mechanism connected to the control unit for receiving control signals;

a sensor for locking status of said front compartment lid, said sensor being connected to the control unit for sending data and at least one vehicle door handle with a sensor for sensing a position of said door handle between in open position and Q closed position, being connected to the control unit for sending data, the control system further comprising a logical block for operating the locking and/or opening mechanism of the front compartment lid of the vehicle connected with the control unit, said logical block being configured to compare the data from said sensor for position of the door handle with a preset threshold value and, in case of matching said sensor data with said preset threshold value, to generate a control signal for the locking and/or opening mechanism of the front compartment lid of the vehicle, wherein generation of said control signal depending also on a current locking status of the front compartment lid of the vehicle.

10. The control system according to claim 9, said at least one door handle being movable between the open and the closed position, wherein said logical block is configured to generate said control signal when the position of the door handle is up to the threshold position set between 45% and 75% of the position needed for opening of the respective vehicle door.

11. The control system according to claim 9, said logical block being configured to generate said control signal after the door handle is moved back to partially or fully closed position.

12. The control system according to claim 9, further comprising a sensor for current speed of the vehicle, a sensor for current security status of the vehicle and/or a sensor for current position of a gear selector of the vehicle, each of said sensors being connected to the control unit for sending data, wherein said logical block is configured to generate a control signal for the locking and/or opening mechanism of the front compartment lid also depending on a current status of the vehicle as provided by data received by at least one of said sensors for current speed of the vehicle, for current security status of the vehicle and/or for current position of a gear selector of the vehicle.

13. The control system according to claim 9, the control signal being chosen from the following: open or close the front compartment lid, lock or unlock the locking mechanism of the front compartment lid, or any combination or consolidation of them.

14. The control system according to claim 9, said logical block being a part of an external electronic device connected to the control unit of the vehicle, providing access to the CAN bus of the vehicle.

15. The control system according to claim 9, said at least one vehicle door handle being a handle of a front door of the vehicle.

16. The control system according to claim 9, said sensor for sensing a position of said door handle being a sensor for sensing an angular position of the door handle.

* * * * *